United States Patent
Wulff et al.

(10) Patent No.: US 9,758,242 B2
(45) Date of Patent: Sep. 12, 2017

(54) LIFT OFFSET MANAGEMENT AND CONTROL SYSTEMS FOR COAXIAL ROTORCRAFT

(71) Applicant: Sikorsky Aircraft Corporation, Stratford, CT (US)

(72) Inventors: Ole Wulff, Ansonia, CT (US); Derek Geiger, Wilton, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

(21) Appl. No.: 14/974,988

(22) Filed: Dec. 18, 2015

(65) Prior Publication Data

US 2016/0224030 A1 Aug. 4, 2016

Related U.S. Application Data

(60) Provisional application No. 62/118,270, filed on Feb. 19, 2015, provisional application No. 62/111,899, filed on Feb. 4, 2015.

(51) Int. Cl.
| | |
|---|---|
| *B64C 27/00* | (2006.01) |
| *B64C 27/82* | (2006.01) |
| *G05D 1/08* | (2006.01) |
| *B64C 27/10* | (2006.01) |

(52) U.S. Cl.
CPC ............ *B64C 27/10* (2013.01); *B64C 27/008* (2013.01); *B64C 27/82* (2013.01); *G05D 1/0858* (2013.01); *B64C 2027/8236* (2013.01)

(58) Field of Classification Search
CPC ....... B64C 27/10; B64C 27/008; B64C 27/82; B64C 2027/8236; G05D 1/0858

USPC .......................................................... 701/4
See application file for complete search history.

(56) References Cited

U.S. PATENT DOCUMENTS

| | | | |
|---|---|---|---|
| 3,409,249 A | 11/1968 | Bergquist | |
| 3,570,786 A | 3/1971 | Lewis, II | |
| 4,008,979 A | 2/1977 | Cooper | |
| 7,210,651 B2 | 5/2007 | Scott | |
| 7,264,199 B2 * | 9/2007 | Zientek | B64C 27/08 244/17.11 |
| 7,604,198 B2 | 10/2009 | Petersen | |
| 7,988,089 B2 | 8/2011 | Wittmer | |
| 8,636,473 B2 | 1/2014 | Brunken | |
| 8,640,985 B2 | 2/2014 | Brunken | |
| 2005/0236518 A1 * | 10/2005 | Scott | B64C 27/10 244/17.23 |

(Continued)

FOREIGN PATENT DOCUMENTS

| | | |
|---|---|---|
| EP | 2099676 | 12/2011 |
| EP | 2613033 | 7/2013 |
| EP | 2829471 A1 | 1/2015 |

OTHER PUBLICATIONS

EP Partial Search Report issued Jun. 30, 2016. European Patent Application No. EP15201067, 9 pages.

*Primary Examiner* — Yazan Soofi
(74) *Attorney, Agent, or Firm* — Cantor Colburn LLP

(57) ABSTRACT

Lift offset management and control systems are provided for a rotorcraft including main rotor and auxiliary propulsor assemblies, the main rotor assembly including first and second rotors disposed to oppositely rotate relative to an airframe about a same rotational axis, and sensors disposed to generate hub moment, tip clearance and lift offset data of the main rotor assembly.

15 Claims, 6 Drawing Sheets

(56) References Cited

U.S. PATENT DOCUMENTS

2015/0028152 A1\* 1/2015 Eller .................... B64C 27/001
 244/17.13

\* cited by examiner

LIFT OFFSET MANAGEMENT AND CONTROL SYSTEMS FOR COAXIAL ROTORCRAFT

STATEMENT OF GOVERNMENT RIGHTS

This invention was made with government support under W911W6-13-2-0013 awarded by the Army. The government has certain rights in the invention.

CROSS REFERENCE TO RELATED APPLICATION

This application is a Non-Provisional Application of U.S. Provisional Application No. 62/118,270, which was filed Feb. 19, 2015, and U.S. Provisional Application No. 62/111,899, which was filed Feb. 4, 2015. The entire disclosures of both U.S. Provisional Application No. 62/118,270 and U.S. Provisional Application No. 62/111,899 are incorporated herein by reference.

BACKGROUND OF THE INVENTION

The subject matter disclosed herein relates to lift offset management and control systems and, more particularly, to lift offset management and control systems for a coaxial rotorcraft.

A coaxial aircraft, such as a coaxial, counter-rotating helicopter, has an airframe that has a top portion and a tail portion extending in the aft direction. The aircraft further includes a main rotor assembly at the top portion and an auxiliary propulsor at the tail portion. When driven to rotate by an engine supported within or on the airframe via a transmission, the main rotor assembly, which includes coaxial, counter-rotating rotors, generates lift for the aircraft and the auxiliary propulsor generates thrust. The pilot (and crew) and the flight computer can cyclically and collectively control the pitching of the blades of at least the main rotor assembly in order to control the flight and navigation of the aircraft.

BRIEF DESCRIPTION OF THE INVENTION

According to one aspect of the invention, a lift offset management system is provided. The system includes first and second rotors disposed to oppositely rotate about a same rotational axis, sensors disposed to generate hub moment, tip clearance and lift offset data of the first and second rotors, an input unit configured to generate a target lift offset reference command based on flight data, the hub moment data and the tip clearance data and a feedback system configured to generate a correction command based on the lift offset data. The feedback system including a summation unit at which the target lift offset reference and correction commands are combined into an actual lift offset command and a servo control unit disposed to control blade pitching of the first and second rotors based on the actual lift offset command.

In accordance with additional or alternative embodiments, the lift offset management system further includes a storage unit on which the flight data is stored.

In accordance with additional or alternative embodiments, the first and second rotors are disposed at a top portion of a rotorcraft airframe and the rotorcraft airframe includes a tail portion with an auxiliary propulsor.

In accordance with additional or alternative embodiments, the flight data includes data reflective of rotorcraft airspeed and altitude, air density of air surrounding the rotorcraft and a rotorcraft weight.

In accordance with additional or alternative embodiments, the sensors are disposed on at least one of each of the first and second rotors and a non-rotating frame.

In accordance with additional or alternative embodiments, the lift offset data includes lateral lift offset data and longitudinal lift offset data.

According to another aspect of the invention, a rotorcraft is provided and includes an airframe having an upper portion and a tail portion, main rotor and auxiliary propulsor assemblies respectively disposed at the upper and tail portions, the main rotor assembly including first and second rotors disposed to oppositely rotate relative to the airframe about a same rotational axis, sensors disposed to generate hub moment, tip clearance and lift offset data of the main rotor assembly and a lift offset management system.

According to another aspect of the invention, a control system is provided and includes first and second rotors disposed to oppositely rotate about a same rotational axis, sensors disposed to generate hub moment, tip clearance, pitch rate and attitude data of the first and second rotors from which hub moment command, tip clearance command and pitch rate and attitude command data are respectively derivable, a command unit receptive of pilot inputted commands and from which a pilot inputted command signal is accordingly output and a mixer receptive of the tip clearance command data, the hub moment command data and elevator command data, which is reflective of the pitch rate and attitude command data and the pilot inputted command signal. The mixer exclusively couples the tip clearance command data, the hub moment command data and the elevator command data with a rotorcraft controlling tip clearance command, a hub moment command and an elevator command, respectively.

In accordance with additional or alternative embodiments, the command unit includes an inverse plant model unit configured to cancel out errors associated with an inherent aircraft response.

In accordance with additional or alternative embodiments, the first and second rotors are disposed at a top portion of a rotorcraft airframe and the rotorcraft airframe includes a tail portion with an auxiliary propulsor.

In accordance with additional or alternative embodiments, the mixer is configured to decouple the tip clearance command data from the hub moment and elevator commands, the hub moment command data from the tip clearance and elevator commands and the elevator command data from the tip clearance and hub moment commands.

In accordance with additional or alternative embodiments, the sensors are disposed on at least one of each of the first and second rotors and a non-rotating frame.

In accordance with another aspect of the invention, a rotorcraft is provided and includes an airframe having an upper portion and a tail portion, main rotor and auxiliary propulsor assemblies respectively disposed at the upper and tail portions, the main rotor assembly including first and second rotors disposed to oppositely rotate relative to the airframe about a same rotational axis, sensors disposed to generate hub moment, tip clearance and lift offset data of the main rotor assembly and the control system.

In accordance with another aspect of the invention, a rotorcraft is provided and includes an airframe having an upper portion and a tail portion, main rotor and auxiliary propulsor assemblies respectively disposed at the upper and tail portions, the main rotor assembly including first and second rotors disposed to oppositely rotate relative to the airframe about a same rotational axis, sensors disposed to generate hub moment, tip clearance, lift offset data and attitude data of the first and second rotors from which hub moment command, tip clearance command and pitch rate and attitude command data are respectively derivable, a command unit receptive of pilot inputted commands and from which a pilot inputted command signal is accordingly output, a mixer receptive of the tip clearance command data, the hub moment command data and elevator command data, which is reflective of the pitch rate and attitude command data and the pilot inputted command signal. The mixer is configured to exclusively couple the tip clearance command data, the hub moment command data and the elevator command data with a rotorcraft controlling tip clearance command, a hub moment command and an elevator command, respectively. The rotorcraft further includes the lift offset management system.

In accordance with additional or alternative embodiments, the lift offset management system is operable during non-maneuvering flight regime portions and a control system including the command unit and the mixer is operable during maneuvering flight regime portions.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

There is a trade-off in coaxial, counter-rotating rotorcraft design between aircraft performance (lift and drag), hub loads and tip clearance during cruise flight. This trade-off is such that, for a given flight condition (aircraft weight, altitude, airspeed), there exists an optimal point of operation that is normally set based on a-priori knowledge and assumptions. Since the a-priori knowledge and assumptions do not specifically relate to specific cruise flight instances, the setting of the point of operation tends to yield suboptimal performance. However, as will be described below, the setting of the point of operation will be achieved by an optimization scheme. This optimization scheme recognizes that tip clearance, hub moment and performance are related to lift offset and lift offset is controlled by differential cyclic main rotor (MR) inputs and determines an optimal lift offset reference based on measured aircraft states and a detected flight condition. A feedback system tracks the lift offset reference to increase compliance.

In addition, where a stiff blade design is employed for a coaxial, counter-rotating rotorcraft, the main rotor shaft and hub may be confronted with larger moments relative to conventional single main rotor configurations. This can result in increased structural design requirements and component weight and decreased component life. As such, and since blade tip clearance need to be maintained at all times, rigid blades may have generally unstable dynamics that lead to difficulties with conventional main rotor control as a function of time delays between a blade deflection input and the resulting aircraft response. However, as will be described below, main rotor inputs can be mixed with hub moment feedback, tip clearance feedback and pitch feedback such that hub moments can be minimized, adequate tip clearance can be maintained and aircraft flying qualities can be assured at high speed flight.

Figure 1:
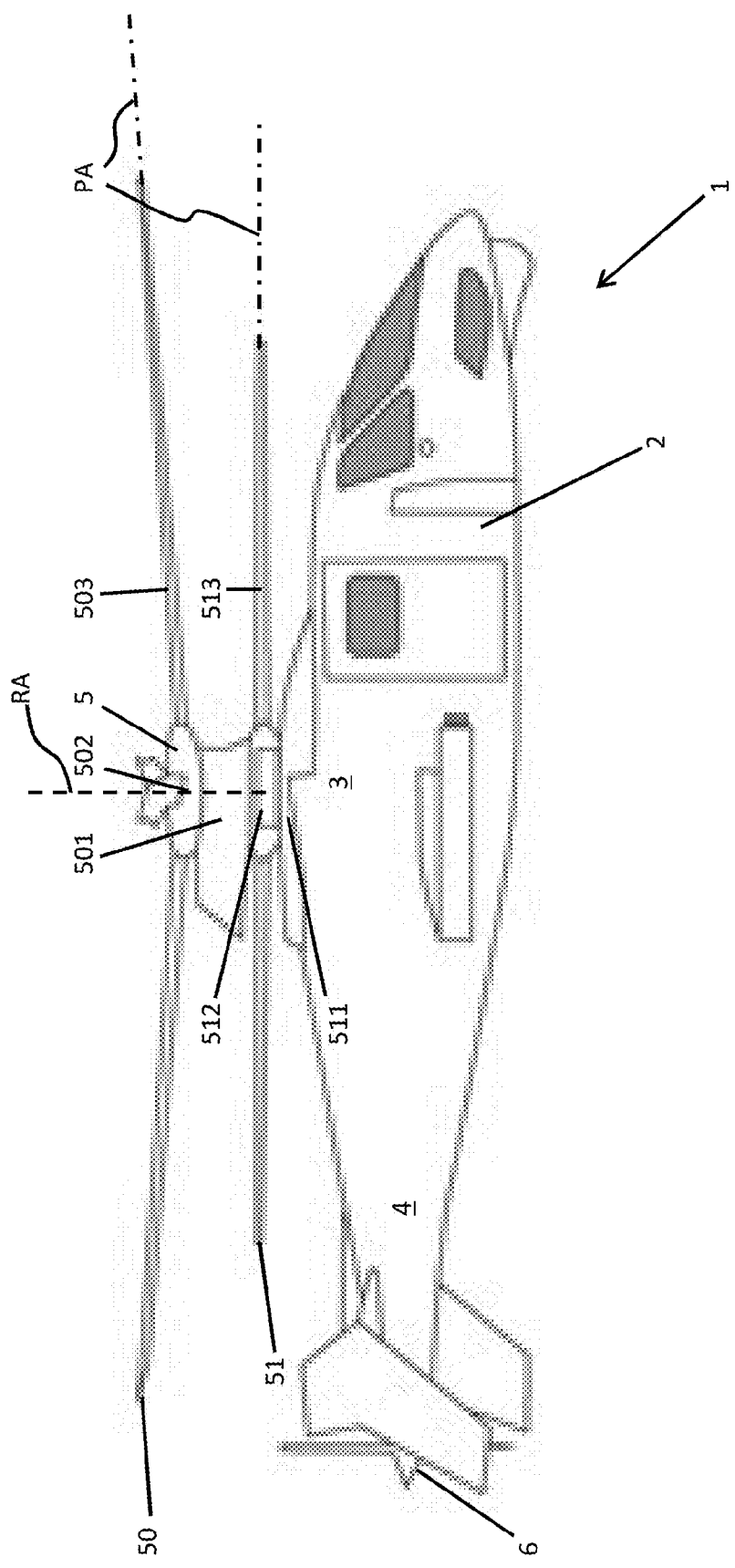
FIG. 1 is a side view of a coaxial, counter-rotating rotorcraft.
Figure 2:
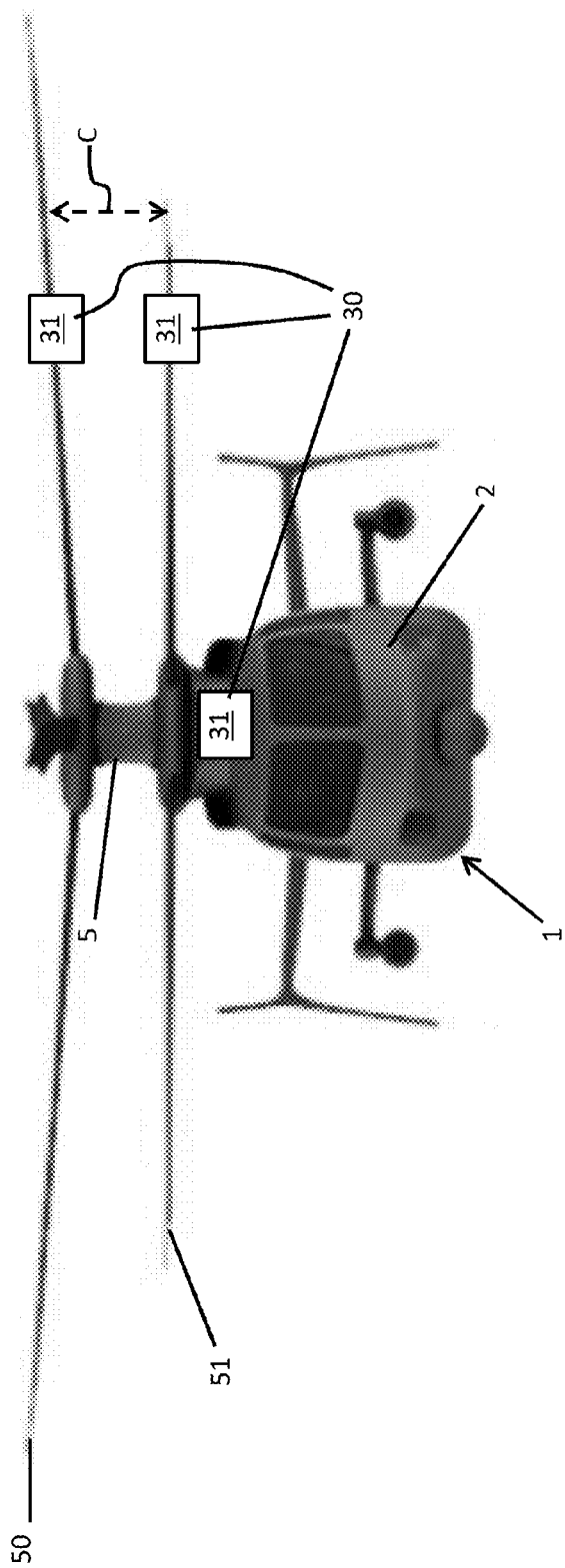
FIG. 2 is a front, elevation view of the rotorcraft of FIG. 1.
Figure 3:
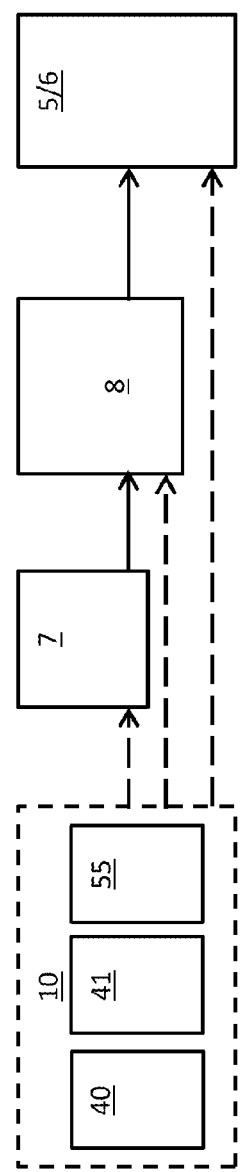
FIG. 3 is a schematic diagram of components of the rotorcraft of FIG. 1.

With reference to FIGS. 1-3, a coaxial rotorcraft 1 is provided and may be configured for example as a coaxial, counter-rotating helicopter or some other fixed or variable wing aircraft with single or multiple rotors. The rotorcraft 1 has an airframe 2 that is sized to accommodate a pilot and, in some cases, one or more crewmen and/or passengers as well as control features and a flight computer 10 (see FIG. 3). The airframe 2 has a top portion 3 and a tail portion 4 that extends in the aft direction. The rotorcraft 1 further includes a main rotor assembly 5 at the top portion 3 of the airframe 2, an auxiliary propulsor 6 at the tail portion 4, an engine 7 (see FIG. 3) and a transmission 8 (see FIG. 3). The engine 7 may be disposed within or on the airframe 2 and is configured to generate power to drive respective rotations of the main rotor assembly 5 and the auxiliary propulsor 6. The transmission 8 is similarly disposed within or on the airframe 2 and is configured to transmit the power from the engine 7 to the main rotor assembly 5 and the auxiliary propulsor 6.

The main rotor assembly 5 includes a first or upper rotor 50 and a second or lower rotor 51. The upper rotor 50 includes a rotor shaft 501, a hub 502 and blades 503 extending radially outwardly from the hub 502. The rotor shaft 501 and the hub 502 are rotatable in a first direction about rotational axis RA, which is defined through the airframe 2, to drive rotations of the blades 503 about the rotational axis RA in the first direction. The lower rotor 51 includes a rotor shaft 511, a hub 512 and blades 513 extending radially outwardly from the hub 512. The rotor shaft 511 and the hub 512 are rotatable in a second direction about the rotational axis RA, which is opposite the first direction, to drive rotations of the blades 513 about the rotational axis RA in the second direction. The auxiliary propulsor 6 has a similar structure with an axis of rotation that is generally aligned with a longitudinal axis of the tail portion 4.

In extending radially outwardly from the hubs 502, 512, the blades 503, 513 are pivotable about respective pitch axes PA that run along respective longitudinal lengths of the blades 503, 513. This pitching can include lateral cyclic pitching, longitudinal cyclic pitching and collective pitching. Lateral cyclic pitching varies blade pitch with left and right movements and tends to tilt the rotor disks formed by the blades 503 and 513 to the left and right to induce roll movements. Longitudinal cyclic pitching varies blade pitch with fore and aft movements and tends to tilt the rotor disks forward and back to induce pitch nose up or down movements. Collective pitching refers to collective angle of attack control for the blades 503, 513 to increase/decrease torque.

When driven to rotate by the engine 7 via the transmission 8, the main rotor assembly 5 generates lift and the auxiliary propulsor 6 generates thrust. The pilot (and crew) and the flight computer 10 can cyclically and collectively control the pitching of the blades 503, 513 of at least the main rotor assembly 5 in order to control the flight and navigation of the rotorcraft 1 in accordance with pilot/crew inputted commands and current flight conditions. In doing so, the blades 503, 513 may be monitored to insure that blade tip clearance C (see FIG. 2) is maintained above a predefined minimum distance so that the respective tips of the blades 503 do not impact the respective tips of the blades 513. Meanwhile, as noted above, there is often a need to increase rotor hub moments on the main rotor assembly 5 in order to achieve high performance for the rotorcraft despite the fact that higher hub moments are associated with decreased blade tip clearance and vice versa.

Figure 4:
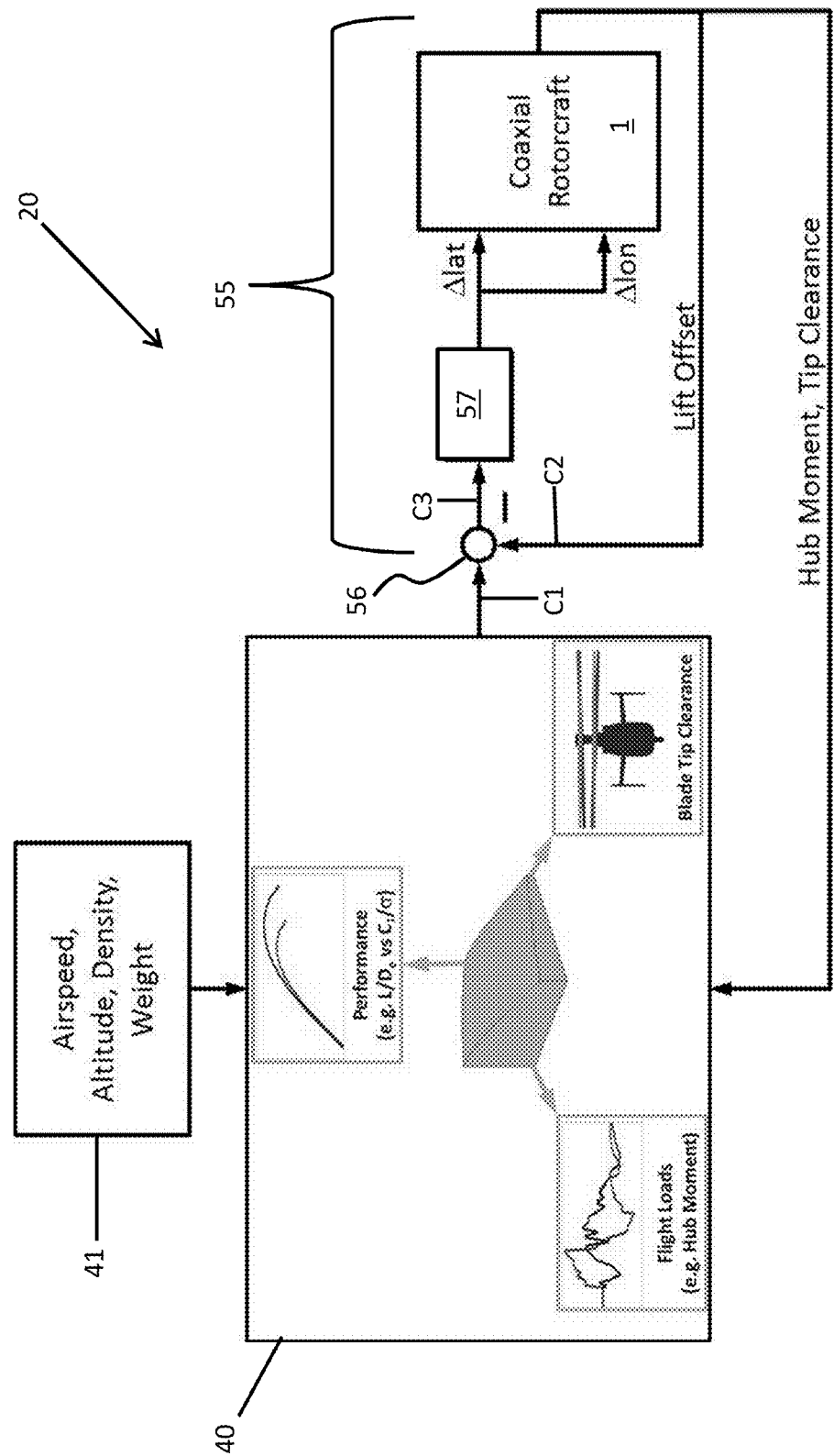
FIG. 4 is a schematic diagram of a lift offset management system of the rotorcraft of FIGS. 1-3.

To this end and, with reference to FIG. 4, a lift offset management system 20 is provided for the rotorcraft 1 although it is to be understood that the lift offset management system 20 can also be useful in other rotorcraft, aircraft or helicopter configurations. The lift offset management system 20 includes the main rotor assembly 5 described above, a system of sensors 30 that are disposed to generate hub moment data, tip clearance data and lift offset data of the main rotor assembly 5, an input unit 40 that can be at least partially provided as a stand-alone unit or as part of the flight computer 10 (see FIG. 3) and a feedback system 55 that can also be at least partially provided as a stand along unit or as part of the flight computer 10 (see FIG. 3). The lift offset management system 20 may generally be operational only during those portions of the flight regime of the rotorcraft 1 that are characterized in that the pilot is not actively inputting pilot commands (i.e., non-maneuvering flight).

The system of sensors 30 may include a plurality of individual sensors 31 that are respectively disposed on rotating or non-rotating frames. That is, the sensors 31 can be disposed on the hubs 502, 512, the blades 503, 513 or on the airframe 2. In any case, the sensors 31 can sense hub moments for the upper rotor 50 and the lower rotor 51, blade tip clearances between the blades 503 of the upper rotor 50 and the blades 513 of the lower rotor 51, a lateral lift offset of the upper rotor 50 and of the lower rotor 51, a longitudinal lift offset of the upper rotor 50 and of the lower rotor 51, a pitch rate of the rotorcraft 1 and an attitude of the rotorcraft 1. Based on such sensing capability, the sensors 31 are further configured to generate the hub moment data, the tip clearance data and the (lateral and longitudinal) lift offset data and to issue the same to the input unit 40.

The input unit 40 is configured to generate a target lift offset reference command C1 based on flight data, which the input unit 40 can receive from a storage unit 41, and based on the hub moment data and the tip clearance data received from the sensors 31. The flight data may include current flight data that is reflective of rotorcraft airspeed and altitude, air density of air surrounding the rotorcraft 1 and a rotorcraft weight. The feedback system 55 is configured to generate a correction command C1 based on the lift offset data received from the sensors 31 and includes a summation unit 56 and a servo control unit 57.

The summation unit 56 may include a summing element at which the target lift offset reference command C1 and the correction command C2 are combined into an actual lift offset command C3. This actual lift offset command C3 is then fed into the servo control unit 57. The servo control unit 57 is thus disposed to control a pitching of the respective blades 503, 513 of the upper and lower rotors 50 and 51 based on the actual lift offset command C3. In this way, the lift offset management system 20 provides for execution of an optimization scheme to determine an optimal lift offset reference that is based on measured states of the rotorcraft 1 and detected flight conditions while the feedback system 55 tracks the lift offset reference to increase the ability of the target lift offset reference to be met. This could result in increased fuel economy for the rotorcraft 1 and in more optimal flight operation through an entire cruise envelope.

Figure 5:
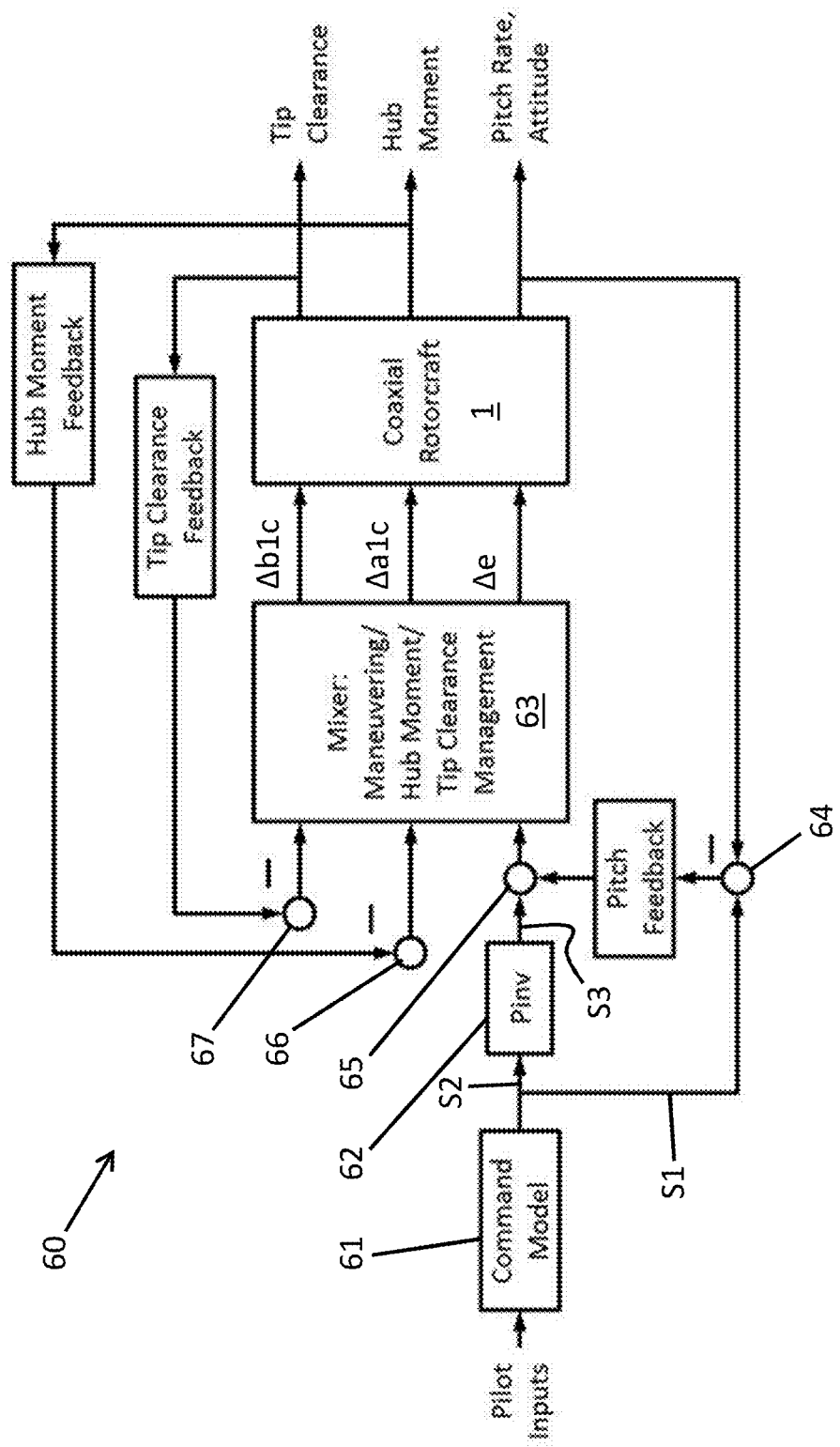
FIG. 5 is a schematic diagram of a hub moment-tip clearance-model following control system of the rotorcraft of FIGS. 1-3.

With reference to FIGS. 5 and 6, a hub moment and tip clearance model following control system 60 (hereinafter referred to as a control system 60) is provided for at least the rotorcraft 1 in a similar manner as the lift offset management system 20 described above. However, where the lift offset management system 20 may generally be operational only during non-maneuvering flight, such as when the pilot of the rotorcraft 1 is not manipulating the stick, the control system 60 may generally be operational during those portions of the flight regime of the rotorcraft 1 that are characterized in that the pilot is actively inputting pilot commands. Such portion of the flight regime may be referred to as maneuvering flight during which the pilot is inputting pilot commands or otherwise manipulating the stick.

By blending operational and non-operational modes of the lift offset management system 20 and the control system 60, an entirety of the flight regime (i.e., the non-maneuvering and the maneuvering flight) of the rotorcraft 1 can be addressed and controlled.

As shown in FIG. 5, the control system 60 includes a command model unit 61, an inverse plan model unit 62, a multiplexer or mixer 63 and first-fourth summation units 64-67. During flight operations of the rotorcraft 1 with the control system 60 operational (i.e., during maneuvering flight) and the mixer 63 activated, pilot inputs are actively input into the command model unit 61 and the command model unit 61 in turn outputs first and second pitch command signals S1 and S2 to the first summation unit 64 and to the inverse plan model unit 62, respectively. The first and second pitch command signals S1 and S2 are reflective of a desired aircraft flight response.

At the first summation unit 64, the first pitch command signal S1 is used as a reference by which pitch rate and attitude data of the rotorcraft 1 are developed into pitch feedback that is to be input into the second summation unit 65. The pitch rate and attitude data of the rotorcraft 1 may be provided by the system of sensors 30 described above. Meanwhile, at the inverse plan model unit 62, the second pitch command signal S2 is revised in order to cancel out errors associated with an inherent aircraft response. The second pitch command signal S2 as revised by the inverse plan model unit 62 is then output to the second summation unit 65 as a revised signal S3. This revised signal S3 is summed with the pitch feedback at the second summation unit 65 and output to the mixer 63 as elevator command data E.

Figure 6A:
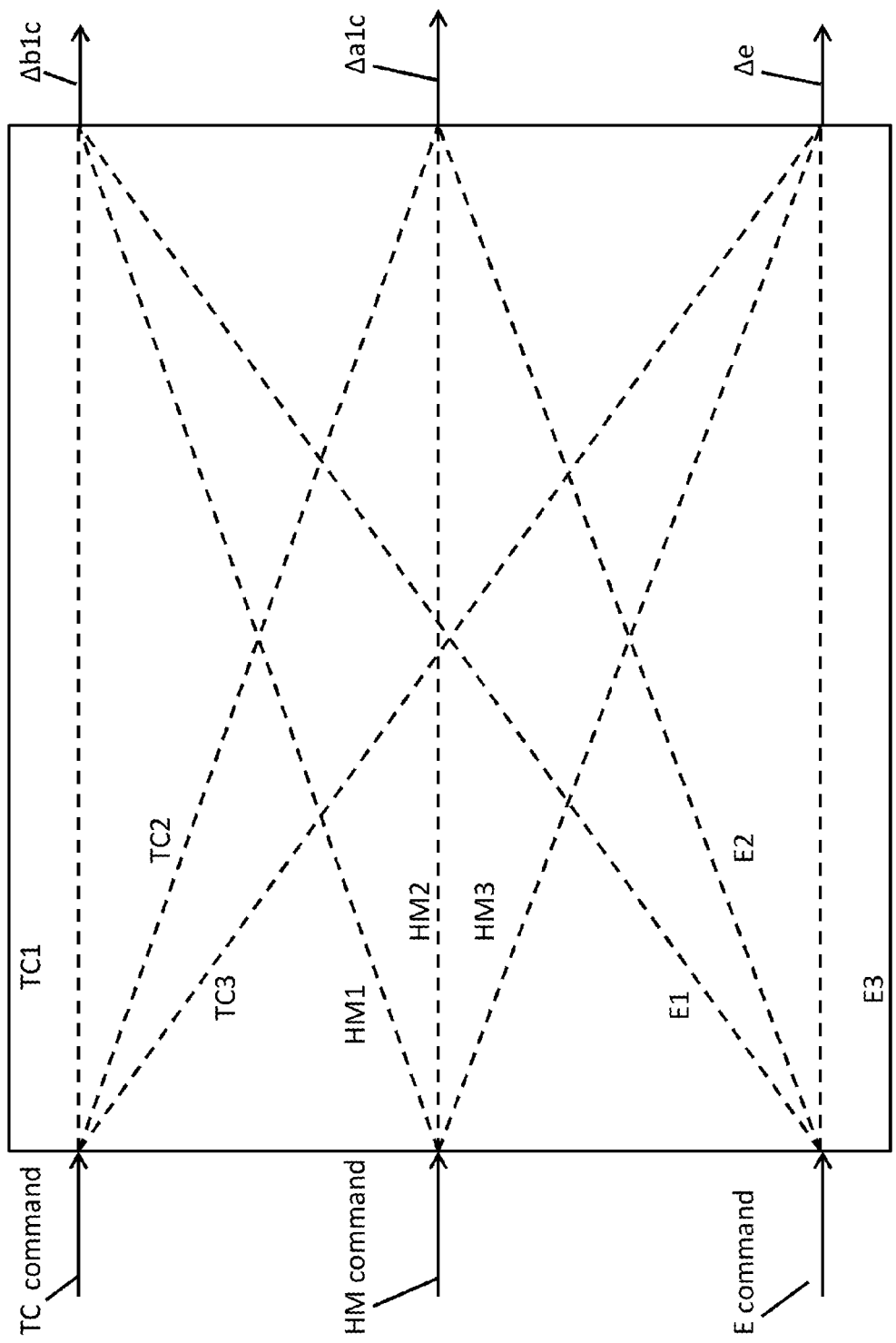
FIG. 6A is a graphical illustration of command data and signal coupled relationships.

In addition to the elevator command data E, the mixer 63 also receives inputs reflective of tip clearance feedback command data TC and hub moment feedback command data HM, which are respectively provided by the system of sensors 30. With continued reference to FIG. 5 and with additional reference to FIG. 6A, the elevator command data E, the tip clearance command data TC and the hub moment command data HM all may be employed during certain flight regimes (i.e., the non-maneuvering flight regime) with the mixer 63 deactivated to affect each of the elevator command Δe, the tip clearance command Δblc and the hub moment command Δalc. That is, as shown in FIG. 6A, the elevator command data E is developed into a first elevator signal E1, which may be employed to affect the tip clearance command Δblc, a second elevator signal E2, which may be employed to affect the hub moment command Δalc, and a third elevator signal E3, which may be employed to affect the elevator command Δe. Similarly, the tip clearance command data TC is developed into a first tip clearance signal TC1, which may be employed to affect the tip clearance command Δblc, a second tip clearance signal TC2, which may be employed to affect the hub moment command Δalc, and a third tip clearance signal TC3, which may be employed to affect the elevator command Δe. Finally, the hub moment command data HM is developed into a first hub moment signal HM1, which may be employed to affect the tip clearance command Δblc, a second hub moment signal HM2, which may be employed to affect the hub moment command Δalc, and a third hub moment signal HM3, which may be employed to affect the elevator command Δe.

With the elevator command Δe, the tip clearance command Δblc and the hub moment command Δalc so affected, the tip clearance command Δblc and the hub moment command Δalc may be output from the mixer 63 to the rotorcraft 1 as various flight commands as shown in FIG. 5. The above described system of sensors 30 then senses the tip clearance, hub moment, pitch rate and attitude of the rotorcraft 1 whereby the pitch feedback, tip clearance feedback and the hub moment feedback can be generated.

Figure 6B:
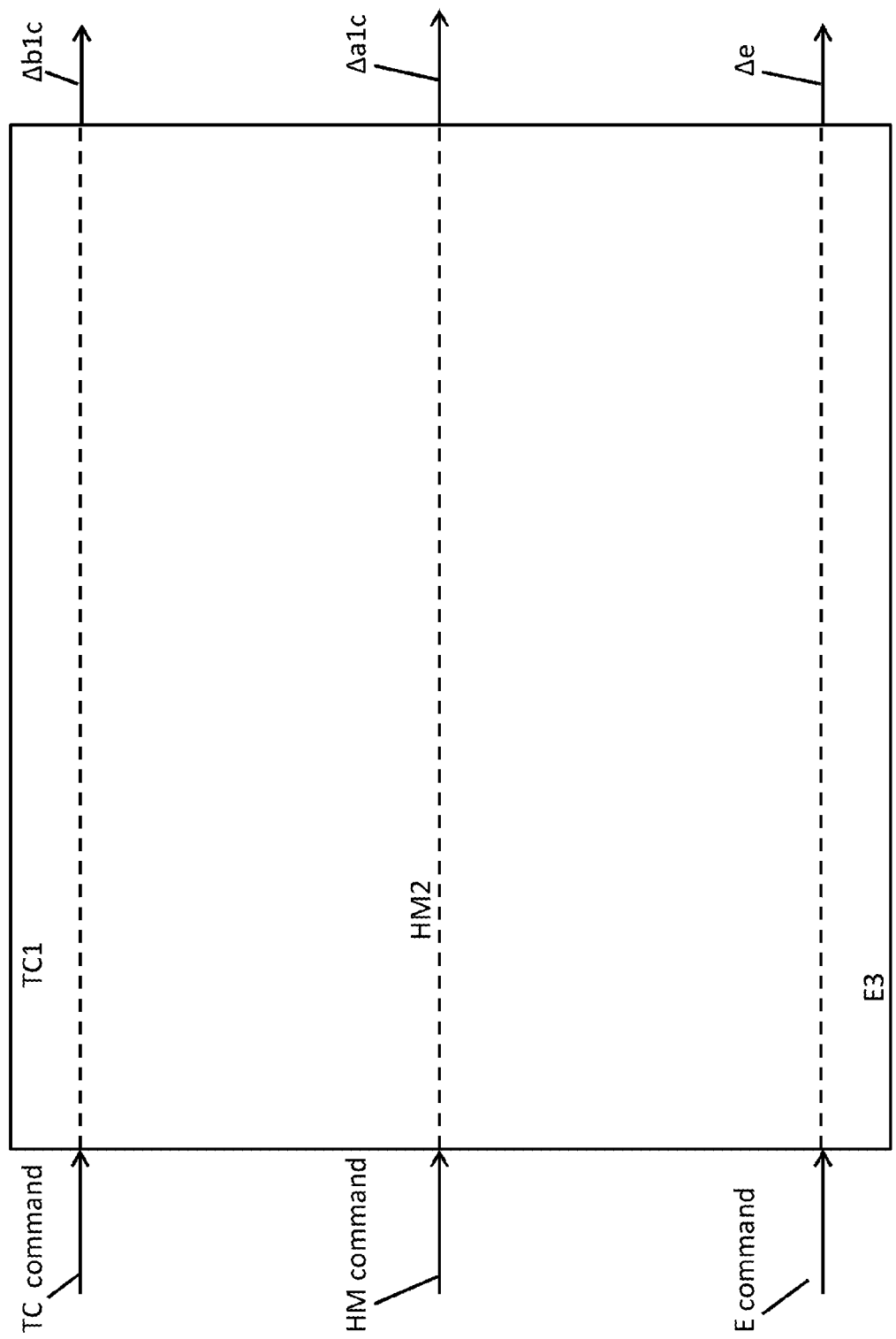
FIG. 6B is a graphical illustration of command data and signal exclusively coupled relationships.

With reference to FIG. 6B, during the maneuvering flight regime and with the mixer 63 activated, however, the mixer 63 exclusively couples the elevator command data E with the elevator command Δe and decouples the elevator command data E from the tip clearance command Δblc and the hub moment command Δalc. In a similar manner and, with the mixer 63 activated, the mixer 63 exclusively couples the tip clearance command data TC and the hub moment command data HM with the tip clearance command Δblc and the hub moment command Δalc, respectively, and decouples the tip clearance command data TC and the hub moment command data HM from the elevator command Δe and the hub moment command Δalc and from the elevator command Δe and the tip clearance command Δblc, respectively.

In accordance with embodiments, the decoupling of the elevator command data E from the tip clearance command Δblc and the hub moment command Δalc may be achieved by the mixer 63 zeroing out the first and second elevator signals E1 and E2. Similarly, the decoupling of the tip clearance command data TC from the elevator command Δe and the hub moment command Δalc may be achieved by the mixer 63 zeroing out the second and third tip clearance signals TC2 and TC3 and the decoupling of the hub moment command data HM from the elevator command Δe and the tip clearance command Δblc may be achieved by the mixer 63 zeroing out the first and third hub moment signals HM1 and HM3.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A lift offset management system, comprising:
   first and second rotors disposed to oppositely rotate about a same rotational axis;
   sensors disposed to generate hub moment, tip clearance and lift offset data of the first and second rotors;
   an input unit configured to generate a target lift offset reference command based on flight data, the hub moment data and the tip clearance data; and
   a feedback system configured to generate a correction command based on the lift offset data and comprising:
   a summation unit at which the target lift offset reference and correction commands are combined into an actual lift offset command; and
   a servo control unit disposed to control blade pitching of the first and second rotors based on the actual lift offset command.

2. The lift offset management system according to claim 1, further comprising a storage unit on which the flight data is stored.

3. The lift offset management system according to claim 1, wherein the first and second rotors are disposed at a top portion of a rotorcraft airframe comprising a tail portion with an auxiliary propulsor.

4. The lift offset management system according to claim 1, wherein the flight data comprises data reflective of rotorcraft airspeed and altitude, air density of air surrounding the rotorcraft and a rotorcraft weight.

5. The lift offset management system according to claim 1, wherein the sensors are disposed on at least one of each of the first and second rotors and a non-rotating frame.

6. The lift offset management system according to claim 1, wherein the lift offset data comprises lateral lift offset data and longitudinal lift offset data.

7. The lift offset management system according to claim 1, wherein the lift management system is incorporated into a rotorcraft, comprising:
   an airframe having an upper portion and a tail portion;
   main rotor and auxiliary propulsor assemblies respectively disposed at the upper and tail portions, the main rotor assembly including first and second rotors disposed to oppositely rotate relative to the airframe about a same rotational axis; and
   sensors disposed to generate hub moment, tip clearance and lift offset of the main rotor assembly.

8. A control system, comprising:
   first and second rotors disposed to oppositely rotate about a same rotational axis;
   sensors disposed to generate hub moment, tip clearance, pitch rate and attitude data of the first and second rotors from which hub moment command, tip clearance command and pitch rate and attitude command data are respectively derivable;
   a command unit receptive of pilot inputted commands and from which a pilot inputted command signal is accordingly output; and
   a mixer receptive of the tip clearance command data, the hub moment command data and elevator command data, which is reflective of the pitch rate and attitude command data and the pilot inputted command signal, the mixer being configured to exclusively couple the tip clearance command data, the hub moment command data and the elevator command data with a rotorcraft controlling tip clearance command, a hub moment command and an elevator command, respectively.

9. The control system according to claim 8, wherein the command unit comprises an inverse plan model unit configured to cancel out errors associated with an inherent aircraft response.

10. The control system according to claim 8, wherein the first and second rotors are disposed at a top portion of a rotorcraft airframe comprising a tail portion with an auxiliary propulsor.

11. The control system according to claim 8, wherein the mixer is configured to decouple the tip clearance command data from the hub moment and elevator commands, the hub moment command data from the tip clearance and elevator commands and the elevator command data from the tip clearance and hub moment commands.

12. The control system according to claim 8, wherein the sensors are disposed on at least one of each of the first and second rotors and a non-rotating frame.

13. The control system according to claim 8, wherein the control system is incorporated into a rotorcraft, comprising:
an airframe having an upper portion and a tail portion;
main rotor and auxiliary propulsor assemblies respectively disposed at the upper and tail portions, the main rotor assembly including first and second rotors disposed to oppositely rotate relative to the airframe about a same rotational axis; and
sensors disposed to generate hub moment, tip clearance and lift offset data of the main rotor assembly.

14. The lift offset management system according to claim 1, wherein the lift management system is incorporated into a rotorcraft, comprising:
an airframe having an upper portion and a tail portion;
main rotor and auxiliary propulsor assemblies respectively disposed at the upper and tail portions, the main rotor assembly including first and second rotors disposed to oppositely rotate relative to the airframe about a same rotational axis;
sensors disposed to generate hub moment, tip clearance, lift offset data and attitude data of the first and second rotors from which hub moment command, tip clearance command and pitch rate and attitude command data are respectively derivable;
a command unit receptive of pilot inputted commands and from which a pilot inputted command signal is accordingly output; and
a mixer receptive of the tip clearance command data, the hub moment command data and elevator command data, which is reflective of the pitch rate and attitude command data and the pilot inputted command signal, the mixer being configured to exclusively couple the tip clearance command data, the hub moment command data and the elevator command data with a rotorcraft controlling tip clearance command, a hub moment command and an elevator command, respectively.

15. The rotorcraft according to claim 14, wherein the lift offset management system is operable during non-maneuvering flight regime portions and a control system comprising the command unit and the mixer is operable during maneuvering flight regime portions.

* * * * *